United States Patent
Gavrilo et al.

(10) Patent No.: US 6,675,227 B1
(45) Date of Patent: Jan. 6, 2004

(54) METHOD FOR PROVIDING A SERVICE IMPLEMENTATION FOR BOTH EJB AND NON-EJB ENVIRONMENTS

(75) Inventors: Galina Gavrilo, Riga (LV); Andre Tost, Rochester, MN (US); Dzintars Vilnis, Riga (LV)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 09/587,697

(22) Filed: Jun. 5, 2000

(51) Int. Cl.[7] ............................... G06F 9/00; G06F 9/46
(52) U.S. Cl. ..................... 709/316; 709/331; 709/332
(58) Field of Search .................... 709/316, 331, 709/332

(56) References Cited

U.S. PATENT DOCUMENTS 6,032,152 A * 2/2000 Pearson .................. 707/103 R
6,058,396 A * 5/2000 Birze et al. ............. 707/103 R

OTHER PUBLICATIONS

Thosmas, Enterprise JavaBeans Technology—Server Component Model for the Java Platform, Dec. 1999, Patricia Seybold Group.*
Matena et al., Enterprise JavaBeans, Sun Microsystem Inc., Mar. 1998, pp. 1–112.*
Smith et al., Enterprise JavaBeans and Corba Developer's Guide, Oracle, Dec. 1999, pp. 1–24.*
Mark, Betz, *Other People's Objects*, Borland Inprise, www.borland.com/delphi/papers/betz410.html, 1999, Borland Inc.

* cited by examiner

*Primary Examiner*—John Follansbee
*Assistant Examiner*—Diem Cao
(74) *Attorney, Agent, or Firm*—Lawrence D. Maxwell; Owen J. Gamon

(57) ABSTRACT

A method and object-oriented computing system in which a Java™ implementation of a service is provided dynamically at runtime via a Java™ interface for the service in accordance with the needs of a client computer in one of two varieties: an Enterprise Java Beans™ (EJB) implementation or, alternatively, a non-EJB implementation. Thus, the same service is accessible, without requiring any programming code changes, to both clients operating in an EJB environment and clients operating in a non-EJB environment. The client accesses the service through two non-EJB interfaces, one for the service (object or bean) itself, and the other for an abstract factory class. Both of these client interfaces are non-EJB to avoid dependence upon client access to EJB packages, which may exist for some clients and not for others. These interfaces operate at runtime to provide a non-EJB implementation for the service in the event the client accessing the service is not operating in an EJB environment and, alternatively, to provide an EJB implementation for the service in the event that the client accessing the service is operating in an EJB environment.

15 Claims, 6 Drawing Sheets

METHOD FOR PROVIDING A SERVICE IMPLEMENTATION FOR BOTH EJB AND NON-EJB ENVIRONMENTS

BACKGROUND OF THE INVENTION

1. Field of the Invention

The present invention relates generally to distributed object-oriented computing systems and, more specifically, to such a system that includes an Enterprise Java Beans™ environment.

2. Description of the Related Art

Object-oriented (OO) computing is perhaps the greatest change that has occurred in the computing paradigm in recent years. The following is a brief synopsis of OO concepts that those readers who are familiar with OO computing may wish to skip. The goal of OO computing is to reduce the time and costs associated with complex software by creating small, reusable sections of program code that can be quickly and easily combined and re-used to create new programs. The code sections are known as objects. OO languages, such as C++ and Java™ have been developed that allow programmers to approach their programming tasks in a way that is believed to be more natural and intuitive than that in which programmers traditionally approached tasks armed only with the tools of procedural (non-OO) programming languages. Using the unique tools or features of an OO language, a programmer can write code to define a software object that models something in the real world. The object can model the attributes or characteristics of the real-world object and, in many cases, also model its behavior.

Objects are instances of classes that define structure and behavior. Objects can be instantiated or created from a class, and then used, stored, and otherwise manipulated in a manner that analogizes them to actual things. The behavior of an object is defined by methods, which are functions or procedures defined in a class and typically can access the internal state of an object of that class to perform some operation. Objects can invoke the methods of other objects.

The unique features of OO computing include, among others, encapsulation and inheritance. Encapsulation is the process of compartmentalizing the elements of an object, such as its contractual interface (with other objects and the outside world) and its implementation. For example, for objects to interact, they need only address each others' interfaces and do not need to be involved with its internal structure or implementation, which can be hidden or made inaccessible to other objects. Inheritance refers to the ability to define a new class by extending an existing one. Inheritance is a relationship between classes where one class is the parent or superclass class of another. A class can inherit from more than one class; this is known as multiple inheritance.

Java™ is an example of an OO programming language. Although Java™ is not more fully described in this patent specification because it is well-understood by persons skilled in the art to which the invention pertains, the distinction between an interface and an implementation class is one Java™ feature that is important to the understanding of the invention. An interface describes a service or method without providing any implementation of it. The actual implementation or functionality of the method is separately provided by an implementation class. Although a Java™ interface is not a class, like a class an interface has OO properties such as the ability to inherit from another interface. The advantage of separating interface from implementation is that client code can be written using only the interface definition; a client need not know the implementation class. Indeed, the implementation class can be be determined at runtime of the code. This scheme is also known as late binding. It is important to note that the same client code can be run in a given case with a given implementation class and, without change, in another case with another implementation class.

Distributed OO computing refers to a networked system in which a client (computer) can access an object that exists anywhere on the network. CORBA® or Common Object Request Broker Architecture is an example of a specification promulgated by the Object Management Group (OMG) that facilitates distributed OO computing. A client need not know on which server (computer) the object is stored on the network. It need not know the operating system of that server. It need not know how the object is implemented; the object's code may be written in essentially any programming language. The client need only know the server interface. A concept that has arisen in the context of distributed OO computing is that of a framework. A framework is a collection of classes that provides an infrastructure within which software developers can work.

Although the foregoing is intended to provide some background information for purposes of this patent specification, OO programming and distributed OO systems are not described in further detail herein because they are well-known to persons skilled in the art to which the below-described invention pertains.

Enterprise Java Beans™ (EJB) is a specification promulgated by Sun Microsystems of Palo Alto, Calif. that describes a server-side services framework in which software developers can create business application programs or, more generally, business objects or components. It is important to note that EJB provides a complete, predefined framework, in contrast to (plain or non-"Enterprise") Java Beans™, which does not. The class that a software developer writes to implement the component functionality is commonly referred to as an Enterprise Java Bean™ (EJB). Two types of EJBs are defined by the specification: session beans, which are stateless, and entity beans, which can provide access to persistent, i.e., stored, data. The emphasis of this framework is on portability. An EJB can be deployed in any computing system that has an EJB environment, without regard to the type of computing platforms in the system. EJB describes a set of application program interfaces (APIs) for accessing services such as naming, persistence and transactions. By conforming their code to these APIs, business software developers can concentrate upon writing code that implements their business functions and not be concerned with services issues. Providing support for complex services is the task of EJB server vendors. Once one has obtained an EJB server, EJB components (i.e., EJBs) can be obtained from any business software vendor and can be expected to run on the EJB server. An important advantage of conforming applications to the EJB specification is that they can use CORBA® services that are provided by the EJB server.

Component providers must be mindful of whether their customers' computing systems have an EJB environment or not, potentially requiring the provider to sell two different versions or flavors of the same component. A component that is deployed in an EJB environment (i.e., an EJB) generally has an interface that inherits from an interface known as EJBObject. This means that any client that uses such a component must have access to EJB packages. In some computing systems, not all clients have access to EJB packages. Thus, a component provider could potentially provide an EJB-enabled version of a component accessible to those clients that have such access, and provide a non-EJB version (e.g., implemented in plain or non-"Enterprise" Java Beans™) accessible to those that do not have such access.

It would be desirable to provide a method for providing a service that clients can use independently of whether it is implemented in an EJB or something else, e.g., a plain or non-"Enterprise" Java Bean™. The present invention addresses these problems and deficiencies and others in the manner described below.

SUMMARY OF THE INVENTION

The present invention relates to a method and object-oriented computing system in which a Java™ implementation of a service is provided dynamically at runtime via a Java™ interface for the service in accordance with the needs of a client computer in one of two varieties: an Enterprise Java Beans™ (EJB) implementation or, alternatively, a non-EJB implementation. Thus, the same service is accessible, without requiring any programming code changes, to both clients operating in an EJB environment and clients operating in a non-EJB environment. The client accesses the service through two non-EJB interfaces, one for the service (object or bean) itself, and the other for an abstract factory class. Both of these client interfaces are non-EJB to avoid dependence upon client access to EJB packages, which may exist for some clients and not for others. These interfaces operate at runtime to provide a non-EJB implementation for the service in the event the client accessing the service is not operating in an EJB environment and, alternatively, to provide an EJB implementation for the service in the event that the client accessing the service is operating in an EJB environment.

The term "EJB implementation" refers to a Java™ implementation object that is instantiated by a home interface predefined by the EJB specification. The term "non-EJB implementation" refers to a Java™ implementation object that is not instantiated via the EJB home interface but rather is defined independently of the EJB specification. A non-EJB object may be, for example, a plain (non-"Enterprise") Java™ bean. The service that is ultimately provided and defined by the implementation object may be any suitable service that does not require access to any of the internal features or services provided exclusively by EJB. The service may be, for example, an e-mail server, fax server, print server or a calendaring function, because the software code for such services can be written without reference to any EJB internal services. Other such services will occur readily to those persons skilled in the art to which the invention pertains in view of the teachings of this patent specification. Note that the feature of the Java™ programming language that provides for separation of interface from implementation is an important factor that enables the present invention to operate.

An intermediate layer is provided in the class hierarchy that includes an inner-layer interface class for the service. An outer-layer interface class is also provided. The outer-layer interface class serves as the interface actually used by the client. This inner-layer interface class inherits from both the outer-layer interface class and the EJB object base interface that is predefined in accordance with standard EJB specifications and commonly referred to by the name "EJBObject."

A factory layer having an abstract factory class is provided, which, as selected by late binding of a client computer at runtime, either instantiates an EJB-aware instance of a factory for said service via said home interface class or alternatively instantiates a non-EJB-aware instance of a factory for said service. The decision of which factory instance is used can be based upon any suitable runtime mechanism, such as a system property or whether access to EJB packages is available on the system. Thus, for example, the invention can be used in a distributed system in which certain clients have access to EJB packages and others do not. A client with such access can request an EJB version of the implementation. A client without such access can request a non-EJB version. Regardless of which implementation is requested at runtime, the interface to that implementation remains the same. In other words, both types of clients can use the same interface. The present invention can also be used to facilitate testing of a service object because a software developer can test the object on a local server, i.e., the same server as that on which a non-EJB client program is running, and then commercially deploy the object on servers accessible to EJB clients without changing the interface.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
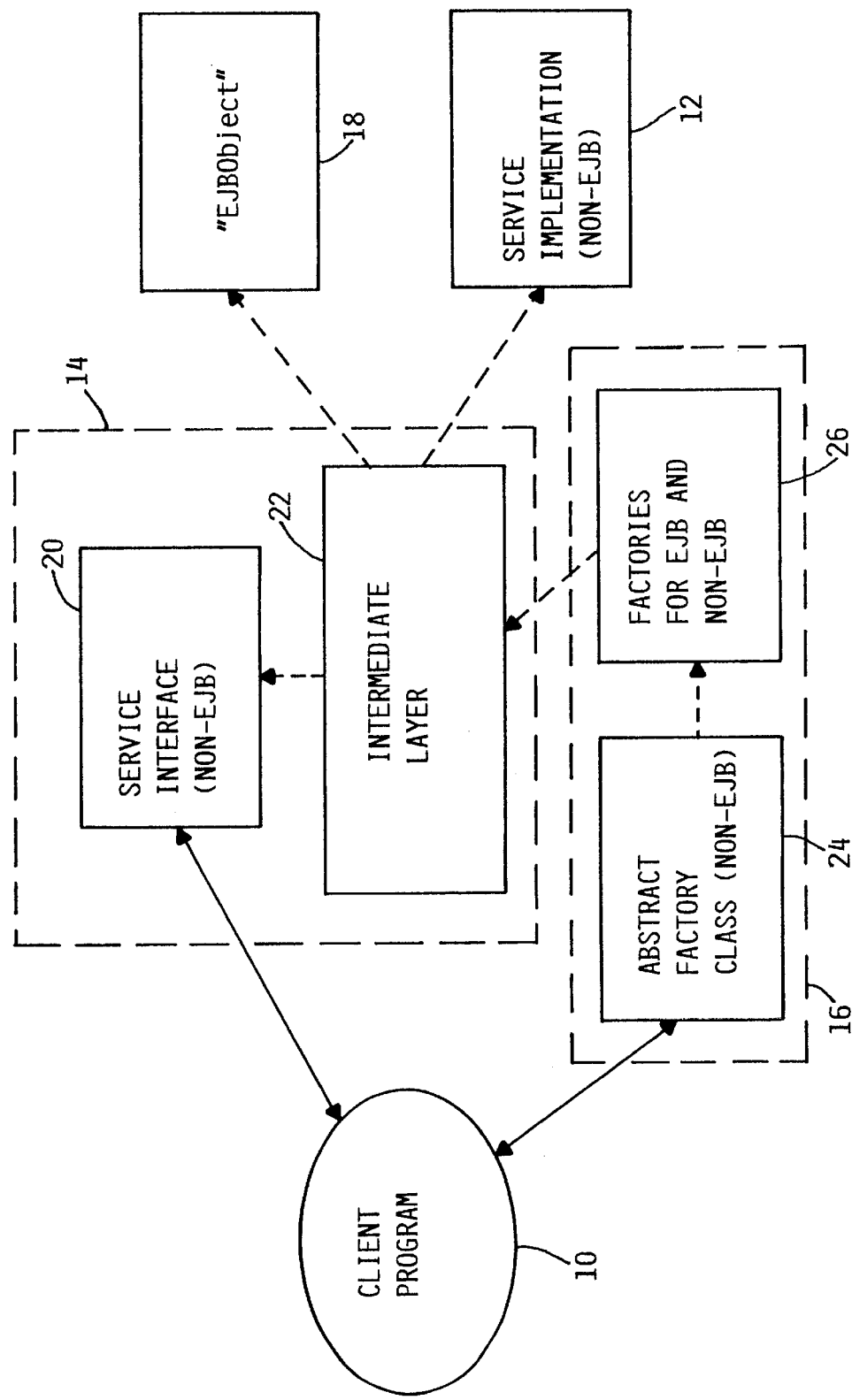
FIG. 1 is a high-level diagram illustrating a system in which an intermediate layer of classes defining EJB interfaces to a service is provided below the layer at which the functional interface to the service is provided.
Figure 2:
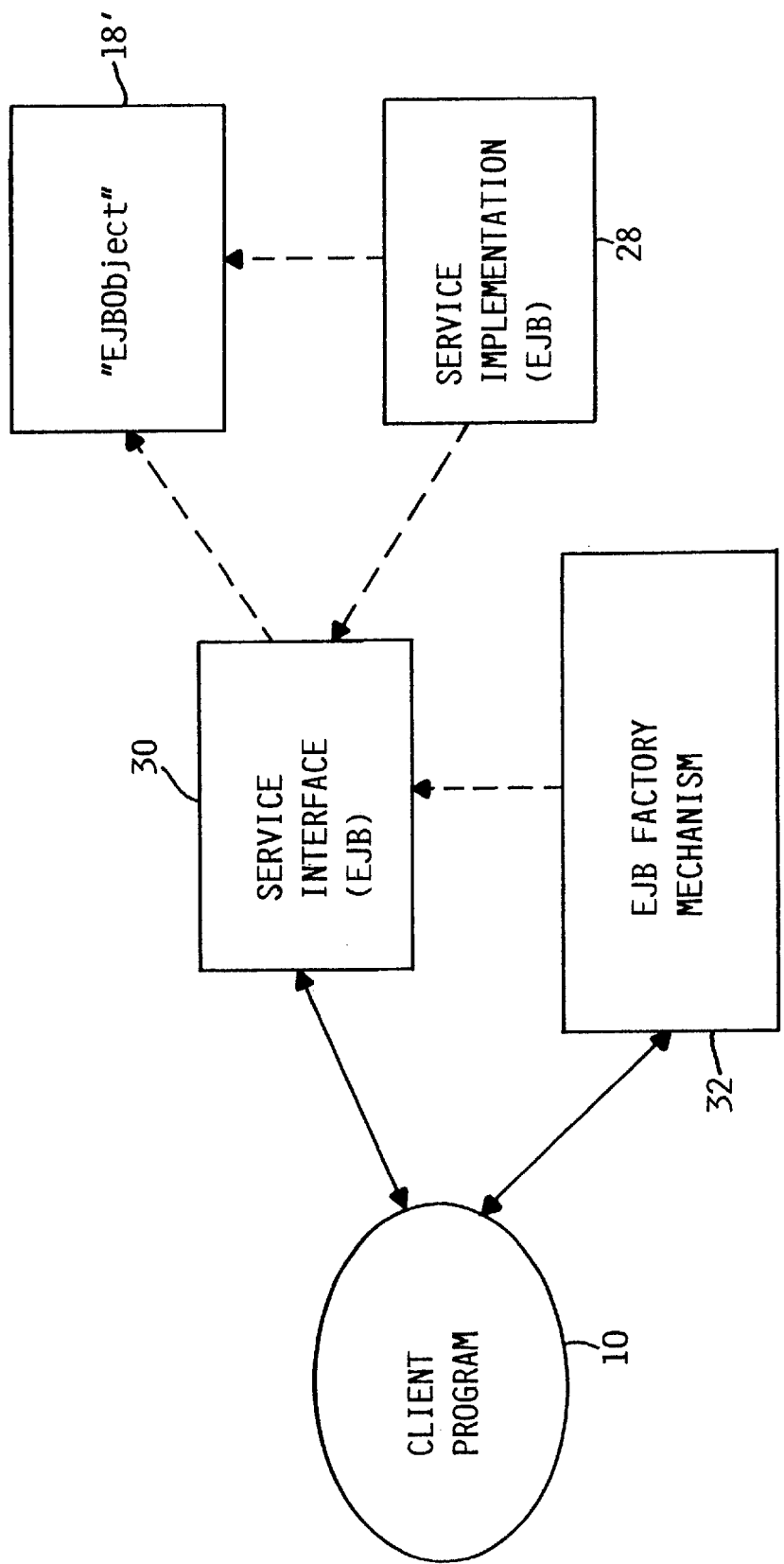
FIG. 2 is a high-level diagram illustrating a prior art system for providing EJB interfaces to a service.

FIG. 1 is a high-level depiction of a software system of the present invention interacting with a client program 10 in an object-oriented (OO) client-server computing system. The elements of the system include a service implementation class 12, a two-layer Java™ interface 14 to client 10, a factory mechanism 16, and the "EJBObject" class 18. EJBObject class 18 is predefined in accordance with the EJB specification with which those persons skilled in the art to which the invention pertains are familiar. Two-layer Java™ interface 14 includes a non-EJB service interface 20 and an intermediate layer 22. Factory mechanism 16 includes a non-EJB abstract factory class 24 and factories 26. These software elements are described in further detail below with respect to FIGS. 3A and 3B. It is the inclusion of intermediate layer 22 that enables EJB dependencies to be mixed into the interface at a level below that at which they are conventionally mixed in. For example, note that in the system illustrated in FIG. 2, which is of a more or less conventional or prior art structure, client program 10 communicates with the service implementation 28 via a single (in contrast to a two-layer) EJB service interface 30. Conventionally, because service interface 30 inherits directly from class "EJBObject" 18', service interface is strictly limited to use by clients 10 that operate in EJB environments, client 10 must have access to EJB packages in order to compile and use service implementation 28. Also note that factory mechanism 32 is a straightforward factory class that instantiates only EJB instances of service implementation 28. In these diagrams, the solid-line arrows denote communication between elements, and the dashed-line arrows between these elements denote generalized dependencies. Note that although the diagram may resemble a unified modeling language (UML) diagram of the type familiar to persons skilled in OO programming, it does not adhere to UML conventions and should not be interpreted as UML.

Referring again to FIG. 1, client program 10 accesses service implementation 12 in one of two alternative ways, the selection of which is determined at runtime of client program 10 in accordance with the needs of client 10. Stated another way, client 10 is presented with an instance or object that is one of two alternative varieties of service implementation class 12. One variety is an EJB implementation. The other variety is a non-EJB implementation. The difference between an EJB implementation and a non-EJB implementation involves in part whether the home interface is used. Each EJB has a home interface. The home interface of an EJB inherits from an interface typically referred to in the EJB specification as "EJBHome." The term "home interface", as used in this patent specification, is intended to refer to that class which performs the home interface function defined in the EJB specification and is not limited to an interface that inherits from an interface of any specific name such as "EJBHome". Indeed, classes, such as the home interface, that are provided in commercially available software packages (i.e., program products) that embody the EJB framework may or may not use the same names set forth herein.

The invention provides great flexibility to software developers and computer system operators. An important advantage of the invention is that the software system described herein can be used in a distributed OO computing system system in which certain clients have access to EJB packages and others do not. A client with such access can request an EJB version of service implementation 12. A client without such access can request a non-EJB version of service implementation 12. Another advantage is that a program product embodying the software system illustrated in FIG. 1 can be used in either environment. For example, a software developer can create and debug the program product in a non-EJB environment for deployment on end-users' EJB environment computing systems. Regardless of which implementation is requested at runtime, the two-layer Java™ interface 14 to that implementation remains the same. So long as a client is capable of communicating via interface 14, the client can access service implementation 12, regardless of whether that client is operating in an EJB environment. This advantage is possible because the outer layer of interface 14, which is service interface 20, is coded such that it is independent of any EJB-specific features or services. Rather, dependencies on EJB-specific features are mixed in at the inner layer of interface 14, which is intermediate layer 22.

Intermediate layer 22 and factory mechanism 16 are described below with respect to FIGS. 3A and 3B in some detail. The remaining software elements of the invention are conventional and can readily be coded or otherwise created or obtained commercially by any person skilled in the art to which the invention relates. Therefore, such elements are not described in detail. It is sufficient to note, for example, that service implementation class 12 represents a Java™ implementation class. This class, in other words, defines the underlying or basic functionality of the service. It may, for example, define a mail server, fax server or print server. The service may be essentially any service that does not require the internal services provided exclusively by EJB. Details of service implementation class 12 are not described in this patent specification because persons skilled in the art to which the invention relates are readily capable of programming or writing suitable code.

Figure 3A:
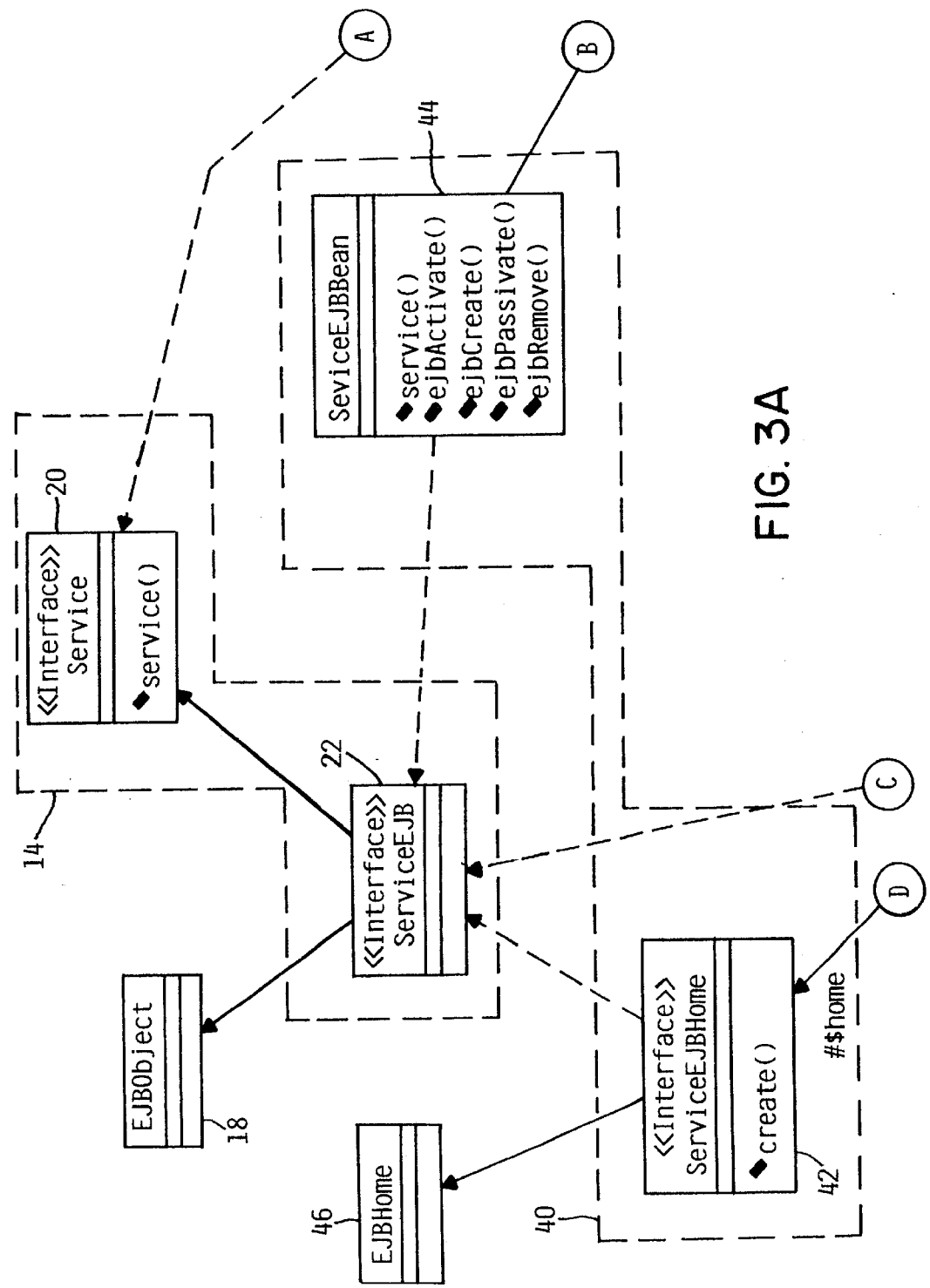
FIGS. 3A and 3B are unified modeling language diagrams illustrating the relationship between classes in an exemplary system.
Figure 3B:
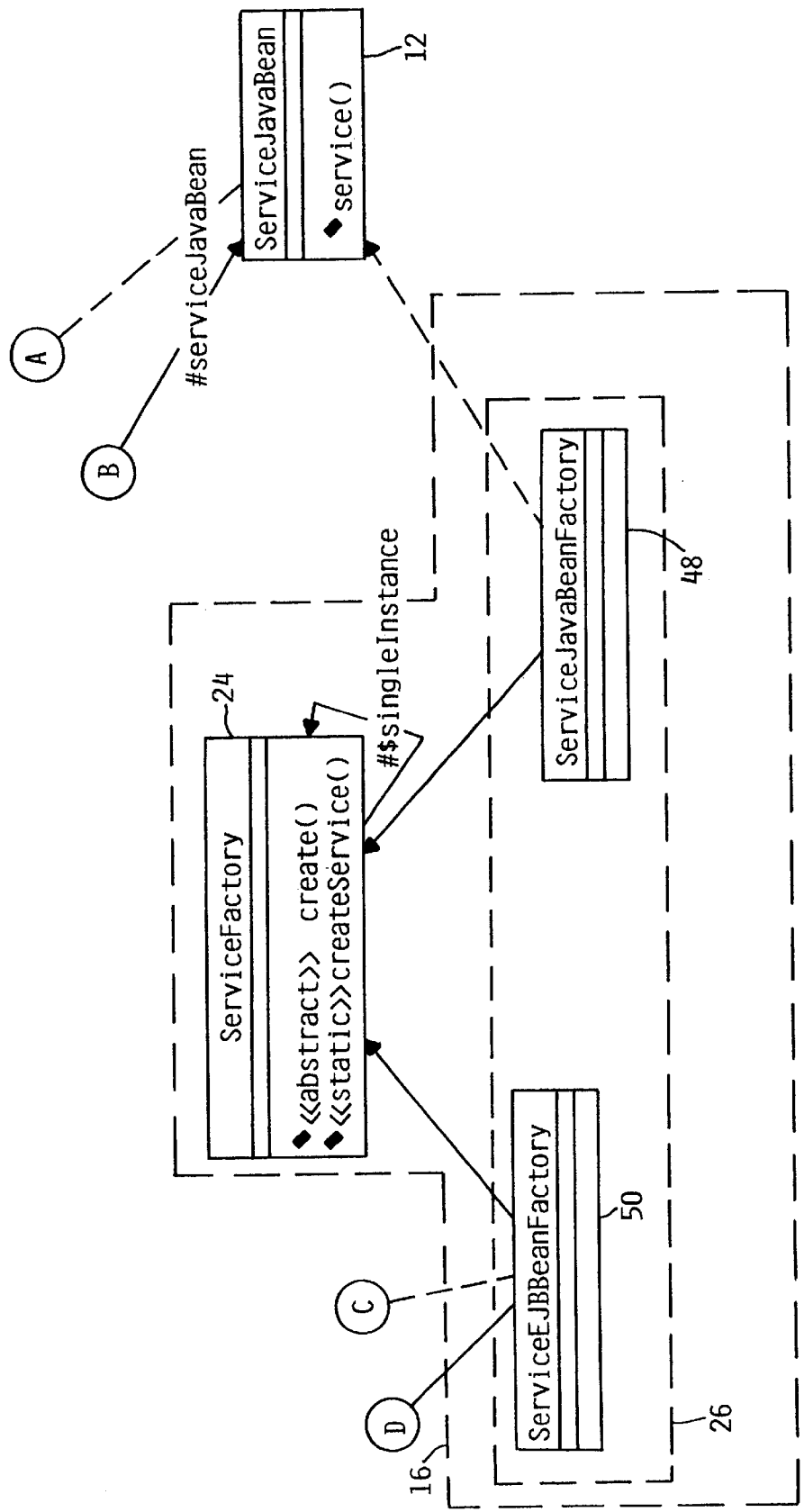
Figure 4:
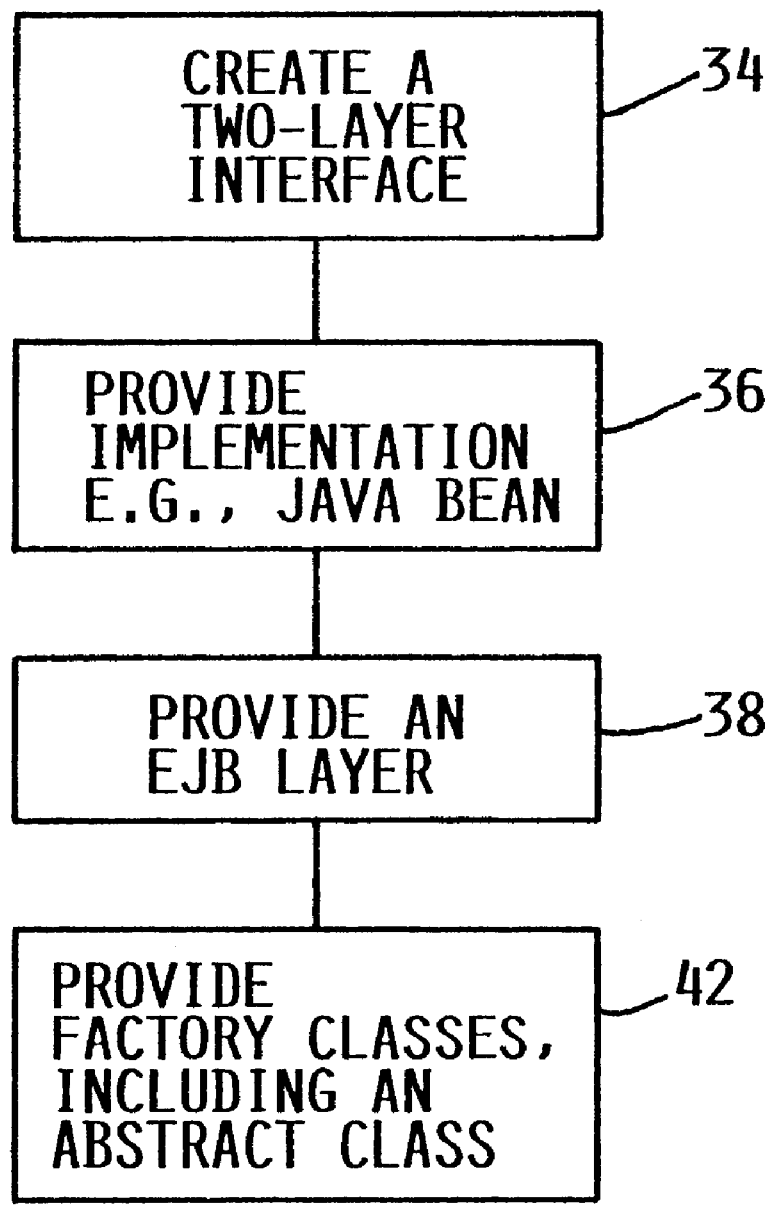
FIG. 4 is a flow diagram illustrating the steps of the method of the invention.

The invention is described with respect to FIG. 4 from the perspective of a method practiced that can be practiced by a software developer. In accordance with the method, beginning at step 34, two-layer Java™ interface 14 is provided. At step 36, service implementation class 12 is provided. Although, as noted above, service implementation class 12 can define any suitable service, it should be EJB-independent. In other words, it does not use any of the EJB application program interfaces (API). Preferably, service implementation class 12 defines objects that are plain (non-"Enterprise") Java™ beans. At step 38, an EJB layer 40 (FIG. 3) is created. EJB layer 40 is omitted from FIG. 1 for purposes of clarity, as FIG. 1 is intended to convey the general structure of the invention, but EJB layer 40 is preferably included in this embodiment of the invention. At step 42, factory mechanism 16 is provided. The order in which these steps are performed is not critical.

FIGS. 3A and 3B illustrate a preferred embodiment of the system and conform to the conventions of unified modeling language (UML). UML is a convention for graphically illustrating the structure of OO software systems. Although persons skilled in the art to which the invention pertains are familiar with UML, others should at least be aware that: the solid-line arrows with solid heads represent inheritance, with the arrow pointing toward the class that is extended; the sold line arrows with open heads represent an association between two classes, with the arrow pointing to the class that is referenced by another class; the dashed-line arrows with solid heads define the relationship between an implementation class and its inheritance class, with the arrow pointing from the implementation to its interface; and the dashed-line arrows with open heads represent a dependency between two classes. interface; and the dashed-line arrows with open heads represent a dependency between two classes.

In this embodiment of the invention, intermediate layer 22 consists of an interface "Service EJB", which inherits from both "EJBObject" class 18 and service interface class 20 ("Service"). Thus, "Service" is the actual interface from the perspective of client 10 (FIG. 1). It does not depend upon any EJB-related feature or service. The derived interface, "ServiceEJB", mixes in EJB dependency by extending the "EJBObject" class.

EJB layer 40 causes instantiation of the actual EJB itself (i.e., the bean). A session bean is preferred, because the EJB need not be persisted in this embodiment. (Note that the EJB specification defines two types of EJB: session beans, which are typically stateless, and entity beans, which provide access to persistent data.) EJB layer 40 includes a home interface 42 ("ServiceEJBHome") and an EJB implementation class 44 ("ServiceEJBBean"). As set forth in the EJB specification, every EJB has a home interface. Clients can use the home interface to create, delete and find a reference to an EJB. In this embodiment, home interface 42 inherits from the "EJBHome" class 46, which is defined in the EJB specification. In addition to the method(s) specific to the service that this EJB provides, e.g., "service( )", EJB implementation class 44 includes some standard methods such as "ejbActivate( )", "ejbCreate( )", "ejbPassivate( )" and "ejbRemove" that are defined in the EJB specification. Thus, the "service( )" method that is defined by service implementation class 12 becomes, by convention, part of EJB implementation class 44. When client 10 invokes the "service( )" method, the request is routed through to service implementation class 12, the instance of which provides the actual service. Note that an EJB can be accessed remotely. In other words, client 10 need not be in the same process (the term "process" referring in this context to a multi-processing computing environment) as the EJB. As noted above, the methods and classes defined in the EJB specification can be readily coded by one skilled in the art or obtained from a commercial source and are therefore not described in further detail herein.

Factory mechanism 16 instantiates the EJB. A factory is a Java™ construct that instantiates objects and, for reasons well-understood by persons of skill in the art, is often preferable to using the "new( )" method, which is a more straightforward mechanism for instantiating objects. Invoking a factory method returns an object that implements an interface. In the present invention, the object instance that is returned implements either an EJB interface or a non-EJB interface. Factory mechanism 16 includes two factories that are subclasses of abstract factory class 24 ("ServiceFactory"): "ServiceJavaBeanFactory" 48, which instantiates an object that is not an EJB; and "ServiceEJBBeanFactory" 50, which instantiates an object that is an EJB and returns a reference to it. The important point is that by means of factory mechanism 16 client 10 can delegate instantiation to either "ServiceJavaBeanFactory" 48 or, alternatively, "ServiceEJBBeanFactory" 50. Client 10 does not have information describing the type, i.e., implementation, of the service, but client 10 can access the service provided that it an access the proper type of interface. A client operating in an EJB environment can request an EJB interface, while a client operating in a non-EJB environment can request a non-EJB interface. Regardless, this switching or selection of factory instances can occur at runtime, implicitly or explicitly by client 10; ultimately, the same service implementation 12 is used regardless of which factory was used.

In operation, a client can request either the EJB implementation or the non-EJB implementation. Note that a client requesting an EJB implementation is (typically though not necessarily) operating in a distributed system remotely from the server, where the client and the EJB do not exist in the same process, and a client requesting a non-EJB implementation (typically though not necessarily) exists in the same process with the EJB in a non-distributed system.

A client requesting a non-EJB implementation first retrieves a reference to a factory by calling a static method on the abstract factory class. This method may have an explicit parameter indicating that no EJB support is available, or it may detect at runtime that EJB support is not available. Thus, the method instantiates the non-EJB factory instance and returns it to the client. The client then calls the creation method on the factory instance. The factory instantiates a new Java™ bean, which provides the service itself. The client can then make calls to the service representation to use the service. As noted above, in a typical operating scenario these steps occur on the same computer, i.e., in a non-distributed system.

A client requesting an EJB implementation retrieves a reference to a factory by calling a static method on the abstract factory class. This method may have an explicit parameter indicating that EJB support is available, or it may detect at runtime that EJB support is available. Thus, the method instantiates the EJB factory instance and returns it to the client. The client then calls the creation method on the factory instance. The factory will retrieve a reference to the target EJB's home interface and delegate instantiation of the EJB to the home object. Note that the home object exists on an EJB server in a separate process from that of the EJB. Thus, the factory makes a remote call to the home to cause the EJB to be instantiated. The home object then creates a new EJB instance (also referred to as a container) in the EJB runtime environment. The EJB instantiates the Java™ bean that defines the actual service implementation. The home object returns a remotely accessible reference to the factory. The factory returns the reference to the client. The client can then make calls to the service representation to use the service.

Figure 5:
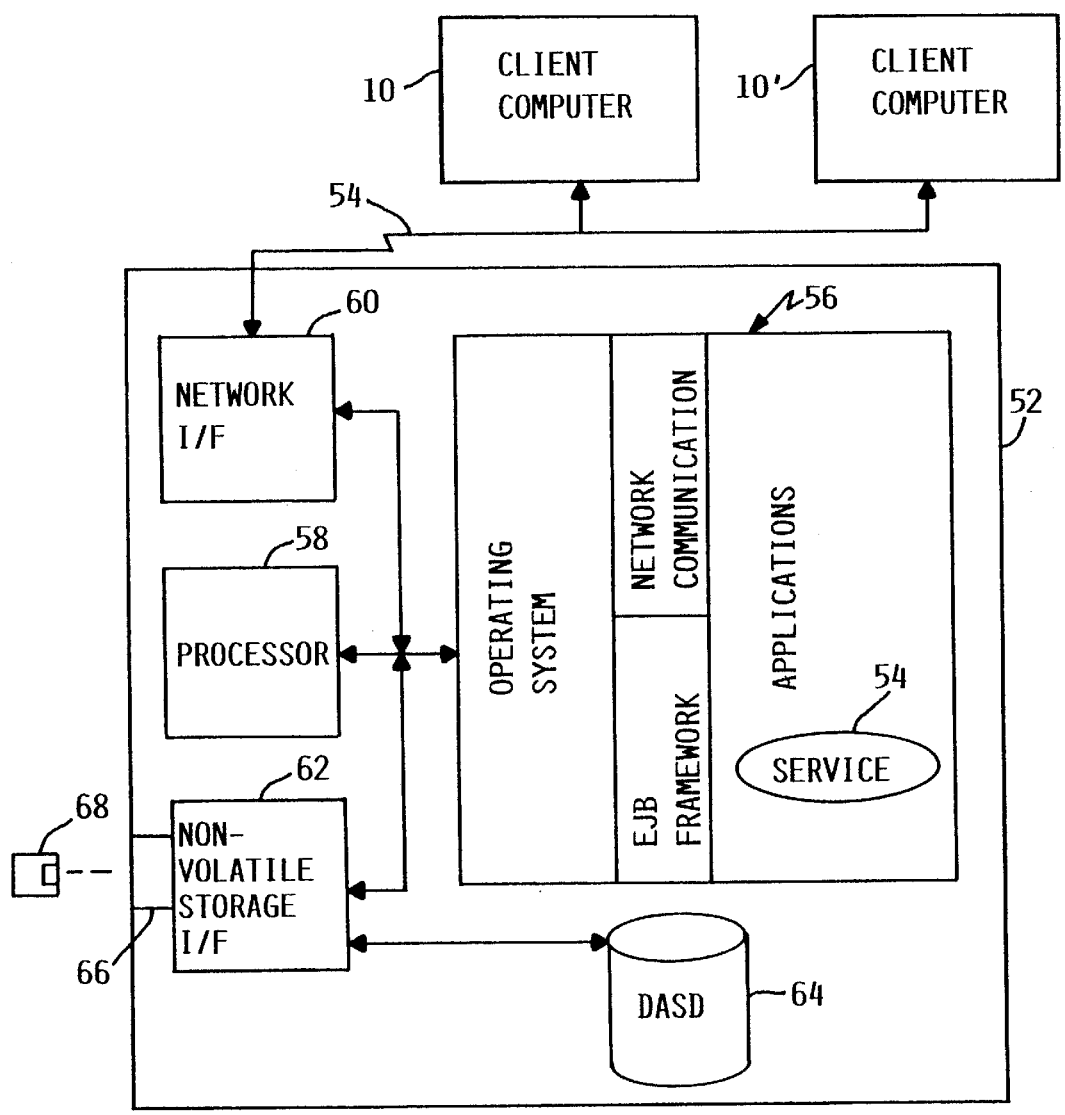
FIG. 5 is a block diagram illustrating a distributed object-oriented computing system supporting the method and system of the invention.

As illustrated in FIG. 5, the system operates in a client-server computing system. As emphasized above, the system can be a distributed system in which multiple clients 10 and 10' can access the server 52 via a network 54, such as the global area-wide network known as the Internet. Client 10 may operate in an EJB environment, i.e., have local access to EJB packages and to an EJB server, while client 10' may not. In FIG. 5, service 54 conceptually represents the collection of classes illustrated in FIGS. 3A and 3B of which the software is comprised This software, as well as other software relating to server 52, such as the operating system, the EJB framework, and software such as RMI that handles network communication, reside on server 52 and execute in its memory 56 in the manner of any software. Although these elements are conceptually illustrated as residing in memory 56, persons of skill in the art will recognize that in actual operation they may or may not reside in memory 56 simultaneously or in their entireties. Such persons will further understand that many other software elements that typically execute in such a computer system are not illustrated for purposes of clarity. In addition to memory 56, server 52 includes other suitable hardware that is typically included in a server computer, such as a processor 58, a network interface 60 and a storage interface 62. Storage interface 62 controls access to a direct-access storage device (DASD) 64 (e.g., a hard disk drive) as well as a removable-media storage device 66 (e.g., a floppy disk drive or optical disk drive). The software elements described that embody a system of the present invention can be proved via a program product, such as a floppy disk 68 on which such elements are recorded. Alternatively, the can be provided via network 54 from a remote site. The software elements can be transferred to DASD 64 for long-term storage, from where they are used during operation of the system by loading them into memory 56 as needed, under the control of processor 58, in the manner well-understood in the art.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. A method for providing on a server computer of an object-oriented computing system a service implementation for both enterprise and non-enterprise environments, comprising the steps of:

providing a service implementation class for a service, said implementation class defining a method that implements said service, wherein the service is independent of the enterprise environment;

providing an outer-layer service interface class for said service implementation class, wherein the outer-layer service interface class is independent of the enterprise environment;

providing an inner-layer service interface class that extends both the outer-layer service interface class and an enterprise base interface that is predefined;

providing an enterprise layer having an enterprise home interface class; and providing a factory layer having a non enterprise factory interface to a client computer and having an abstract factory class that, as selected by late binding of said client computer at runtime, either instantiates an enterprise factory for said service via said home interface class or alternatively instantiates a non enterprise factory for said service.

2. The method claimed in claim 1, wherein an instance of said service implementation class is a non-enterprise bean.

3. The method claimed in claim 1, wherein said enterprise layer includes a wrapper class that provides a wrapper for said service implementation class, said wrapper class providing said service via said inner-layer service interface class.

4. The method claimed in claim 3, wherein said abstract class has a first subclass for instantiating an enterprise instance for said service and a second subclass for instantiating a non enterprise instance for said service.

5. The method claimed in claim 1, wherein said service is selected from the group consisting of: e-mailing, calendaring, faxing and printing.

6. In a server computer of an object-oriented computing system, a system for providing a service implementation for both enterprise and non-enterprise environments, the system comprising:

a service implementation class for a service, said implementation class defining a method that implements said service, wherein the service is independent of the enterprise environment;

an outer-layer service interface class for said service implementation class, wherein the outer-layer service interface class is independent of the enterprise environment;

an inner-layer service interface class that extends both the outer-layer service interface class and an enterprise base interface that is predefined;

an enterprise layer having an enterprise home interface class; and a factory layer having a non enterprise factory interface to a client computer and having an abstract factory class that, as selected by late binding of said client computer at runtime, either instantiates an enterprise factory for said service via said home interface class or alternatively instantiates an non enterprise factory for said service.

7. The system claimed in claim 6, wherein an instance of said service implementation class is a non-enterprise bean.

8. The system claimed in claim 6, wherein said enterprise layer includes a wrapper class that provides a wrapper for said service implementation class, said wrapper class providing said service via said inner-layer service interface class.

9. The system claimed in claim 8, wherein said abstract class has a first subclass for instantiating an enterprise instance for said service and a second subclass for instantiating a non enterprise instance for said service.

10. The system claimed in claim 6, wherein said service is selected from the group consisting of: e-mailing, calendaring, faxing and printing.

11. A computer program product for use in a server computer of an object-oriented computing system, said computer program product defining a system for providing a service implementation for both enterprise and non-enterprise environments, said computer program product comprising a signal-bearing medium carrying thereon:

service implementation class for a service, said implementation class defining a method that implements said service, wherein the service is independent of the enterprise environment;

an outer-layer service interface class for said service implementation class, wherein the outer-layer service interface class is independent of the enterprise environment;

an inner-layer service interface class that extends both the outer-layer service interface class and an enterprise base interface that is predefine;

an enterprise layer having an enterprise home interface class; and a factory layer having a non enterprise factory interface to a client computer and having an abstract factory class that, as selected by late binding of said client computer at runtime, either instantiates an enterprise factory for said service via said home interface class or alternatively instantiates a non-enterprise factory for said service.

12. The computer program product claimed in claim 11, wherein an instance of said service implementation class is a non-enterprise bean.

13. The computer program product claimed in claim 11, wherein said enterprise layer includes a wrapper class that provides a wrapper for said service implementation class, said wrapper class providing said service via said inner-layer service interface class.

14. The computer program product claimed in claim 13, wherein said abstract class has a first subclass for instantiating an enterprise instance for said service and a second subclass for instantiating a non enterprise instance for said service.

15. The computer program product claimed in claim 11, wherein said service is selected from the group consisting of: e-mailing, calendaring, faxing and printing.

* * * * *